(12) United States Patent
Borowski

(10) Patent No.: US 10,993,790 B2
(45) Date of Patent: May 4, 2021

(54) METHOD FOR POSITIONING A SEMIFINISHED PRODUCT, METHOD FOR PRODUCING A SEMIFINISHED PRODUCT FOR REPRODUCIBLE POSITIONING, AND SUITABLE SEMIFINISHED PRODUCT AND CORRESPONDING USE THEREOF

(71) Applicant: Merz Dental GmbH, Luetjenburg (DE)

(72) Inventor: Christian Borowski, Kiel (DE)

(73) Assignee: Merz Dental GmbH, Lütjenburg (DE)

( * ) Notice: Subject to any disclaimer, the term of this patent is extended or adjusted under 35 U.S.C. 154(b) by 363 days.

(21) Appl. No.: 15/528,368

(22) PCT Filed: Nov. 20, 2015

(86) PCT No.: PCT/EP2015/077183
§ 371 (c)(1),
(2) Date: May 19, 2017

(87) PCT Pub. No.: WO2016/079282
PCT Pub. Date: May 26, 2016

(65) Prior Publication Data
US 2017/0319304 A1 Nov. 9, 2017

(30) Foreign Application Priority Data
Nov. 21, 2014 (DE) .......................... 102014117109.8

(51) Int. Cl.
*A61C 13/00* (2006.01)
(52) U.S. Cl.
CPC ...... *A61C 13/0022* (2013.01); *A61C 13/0006* (2013.01)

(58) Field of Classification Search
CPC combination set(s) only.
See application file for complete search history.

(56) References Cited

U.S. PATENT DOCUMENTS

| 3,726,125 | A | * | 4/1973 | Heyman | .............. | G01N 33/442 |
| | | | | | | 374/55 |
| 2009/0273108 | A1 | * | 11/2009 | Koebel | .............. | A61C 13/0004 |
| | | | | | | 264/40.1 |

(Continued)

FOREIGN PATENT DOCUMENTS

| DE | 2542566 | 3/1997 |
| DE | 203 16 004 U1 | 3/2004 |

(Continued)

OTHER PUBLICATIONS

International Search Report for International Patent Application No. PCT/EP2015/077183 dated Mar. 9, 2016 with translation (6 pages).

(Continued)

*Primary Examiner* — Lawrence Averick
(74) *Attorney, Agent, or Firm* — Fish & Richardson P.C.

(57) ABSTRACT

A method for positioning a semifinished product, has the steps of: providing a semifinished product having at least one position mark aligned with the center of contraction or expansion, and providing a machining device for machining and finishing the semifinished product, which is positioned, preferably reproducibly positioned, in the machining device via fastening means and the position mark.

16 Claims, 5 Drawing Sheets

(56) References Cited

U.S. PATENT DOCUMENTS

| | | | | |
|---|---|---|---|---|
| 2014/0366461 | A1* | 12/2014 | Busby | E04F 15/02044 |
| | | | | 52/126.6 |
| 2015/0164643 | A1* | 6/2015 | Farrar | A61L 24/0036 |
| | | | | 623/23.56 |
| 2015/0282905 | A1* | 10/2015 | Jahns | A61K 6/0245 |
| | | | | 433/167 |

FOREIGN PATENT DOCUMENTS

| | | |
|---|---|---|
| DE | 10 2006 052027 | 5/2008 |
| DE | 202012100359 | 3/2012 |
| EP | 1 068 839 | 1/2001 |
| EP | 2 343 025 | 7/2011 |
| JP | 2011143247 | 7/2011 |
| KR | 2013 0136081 | 12/2013 |
| WO | WO 1994/027517 | 12/1994 |
| WO | WO 2013/122662 | 8/2013 |

OTHER PUBLICATIONS

DE Search Report in German Appln. No. 102014117109.8, dated Mar. 23, 2017, 15 pages (with English Translation).
EP Office Action in European Application No. 15816092.9, dated Aug. 14, 2018, 16 pages (with English Translation).
EP Office Action in European Appln. No. 15816092.9, dated Aug. 20, 2019, 15 pages (with English Translation).
JP Office Action and Search Report in Japanese Appln. No. 2017-526542, dated Sep. 24, 2019, 43 pages (with English Translation).
JP Office Action in Japanese Appln. No. 2017-526542, dated Aug. 25, 2020, 7 pages (with English translation).
EP Office Action in European Appln. No. 15816092.9. dated Jun. 30, 2020, 10 pages (with English Translation).
International Preliminary Report on Patentability for PCT/EP2015/077183, dated May 23, 2017 (in English).
JP Notice of Allowance in Japanese Appln. No. 2017-526542, dated Feb. 16, 2021, 5 pages.

* cited by examiner

METHOD FOR POSITIONING A SEMIFINISHED PRODUCT, METHOD FOR PRODUCING A SEMIFINISHED PRODUCT FOR REPRODUCIBLE POSITIONING, AND SUITABLE SEMIFINISHED PRODUCT AND CORRESPONDING USE THEREOF

FIELD OF THE INVENTION

The present invention relates to a method for positioning a semifinished product, to a method for producing a semifinished product with reproducible positioning, to a semifinished product for reproducible positioning, and to the corresponding use of the semifinished product.

BACKGROUND

It is known that numerically controlled milling machines operate in principle with a coordinate system, in which they spatially move and are oriented. The corresponding coordinate system is composed of a plurality of axes, for example five movement axes in the form of three linear axes and two rotation axes. For the orientation of the numerically controlled milling machine with respect to the corresponding semifinished product, absolute or incremental path tracking is used. In order to be able to machine the semifinished product in the machine in a collision-free manner, spatial conditions must be known with high precision. For this reason, it is of great importance that the semifinished product in this coordinate system be accurately defined so as to be able to carry out exact machining on the semifinished product. In this respect, the semifinished product must be oriented for all axes in a defined orientation with respect to the coordinate system of the machine. Depending on the material and the associated physical and chemical properties, dimensional changes may occur during the production of a semifinished product that require a complicated geometric analysis for subsequent finishing on a numerically controlled machine in order to orient them in the coordinate system of the numerical machine. For example, if the semifinished product were to be taken out of the milling machine to perform, for example, measurement checks, further processing or finishing of the semifinished product would be possible only with significant outlay, for example for finishing of reference marks. All the more critical is the reproducible positioning within a milling machine in the case of semifinished products which must be used as freeform bodies in complex geometric conditions, such as for example a dental blank or a tooth.

An attempt is made here to address such occurring dimensional changes by way of zero-point clamping systems. However, this known system has the disadvantage that reference marks are applied subsequently in part to the semifinished product only after the measurement change has taken place. With this subsequent provision of marks on a semifinished product, the geometric conditions on the semifinished product must be exact and accurately known, in order to determine a reference to the position of the zero-point clamping system. A marking of this type is disclosed for example by DE 20 2012 100 359 U1. The marks provided on the semifinished product, however, merely suffice as a "protection against rotation" and are not suitable for exact reproducible positioning, in particular for further processing by machine, especially since these marks are provided by way of subsequent milling only after the production of the semifinished product. These blanks also do not exhibit any complex forms or structures that need to be taken into consideration during further processing.

SUMMARY

It is therefore an object of the present invention to avoid the disadvantages mentioned in the prior art. It is furthermore an object of the present invention to make possible reproducible positioning of a semifinished product that is in the production stage and further processing stage and subject to the dimensional changes.

According to the application, a semifinished product is made available due to the production with at least one position mark aligned with the center of contraction or expansion and, due to the machining, is provided with at least one position mark aligned with the center of contraction or expansion in the semifinished product such that finishing of the semifinished product can be performed in a positioned fashion.

What is achieved on the basis of the measure according to the application by way of at least one position mark aligned with the center of contraction or expansion is that the dimensional changes that occur during the production of the semifinished product still permit precise positioning in the machining apparatus, for example on a milling machine, during subsequent finishing. In this way, it is possible for example to produce from a semifinished product a freeform body in which already predefined geometries (e.g. teeth) are integrated, so as to separate out at a later time, depending on material occurrence, a further freeform body, e.g. adjacent to the teeth, specifically in the form such that the machining apparatus, or the CAM module, has knowledge as to where material removal has already taken place or no longer needs to take place, because the geometric conditions were already specified during the production of the semifinished product to the extent to which a further adjacent freeform body can be removed or worked out of the semifinished product. By introducing at least one position mark into the semifinished product as early as during production, it is thus possible according to the application to compensate for the physical and also chemical influences of the dimensional change. Reproducible and position-accurate retaining of the semifinished product is thus ensured so as to be able to perform, for example, machine finishing on a numerically controlled milling machine. Any complicated geometric position determination for a semifinished product that is removed from the machining apparatus or milling machine is no longer necessary. The subsequent application of a position mark once the semifinished product has adopted its final orientation necessary for machining is no longer necessary either. The positioning outlay for a semifinished product, for example for a tooth prosthesis blank, is thus significantly simplified and the production costs are thus reduced by way of the measure according to the application.

Further advantageous configurations of the invention are the subject matter of the dependent claims.

It has proven advantageous, in particular in a milling method which performs finishing, for the repeated and multiple positioning of the semifinished product, in particular in the form of a freeform body or a dental blank, to be ensured in a simple manner.

Incorporating the positioning in a semifinished product according to the application is advantageous in particular during the production of the semifinished product, because the dimension-changing effect during the production process makes finishing appear to be a problem.

It is likewise an advantage if, during finishing, contraction, shrinkage and humidity influences that can occur during the production of the semifinished product are compensated for.

On the other hand, it has proven advantageous that the method according to the application for positioning is also used advantageously after a hygroscopicity of the semifinished product.

It has proven particularly advantageous for the method according to the application for positioning to be used in the case of volume changes of the semifinished product in the range of 0.5% to 15%, preferably 1% to 10%, preferably 1% or 10%, with respect to the machining of the semifinished product.

A further advantageous configuration occurs if the position mark is provided in a form-bound fashion in the semifinished product, since in this case no further finishing of the position mark needs to be performed either.

The particularly advantageous form of the position mark relates to geometrically reproducible forms, e.g. elongate holes, the preferential direction of which is aligned with the center of contraction or expansion.

Further advantageous configurations of the position mark provide for the cutouts or projections to be formed in the peripheral surface of the semifinished product and preferably for the cutouts to be configured as a groove or placement surfaces.

If moreover the position marks are arranged with rotational symmetry with respect to the center of contraction or expansion, simplified handling in the machining apparatus or milling machine is possible. A particularly advantageous rotational symmetry is achieved if three position marks are provided preferably in a rotation angle of 120°. The rotational symmetry of four position marks which are arranged in a rotation angle of 90° is likewise appropriate. Further advantageous configurations of the present invention are subject matter of the further dependent claims. Advantageous configurations of the invention shall be represented by way of example on the basis of the following figures.

DETAILED DESCRIPTION

Figure 1:
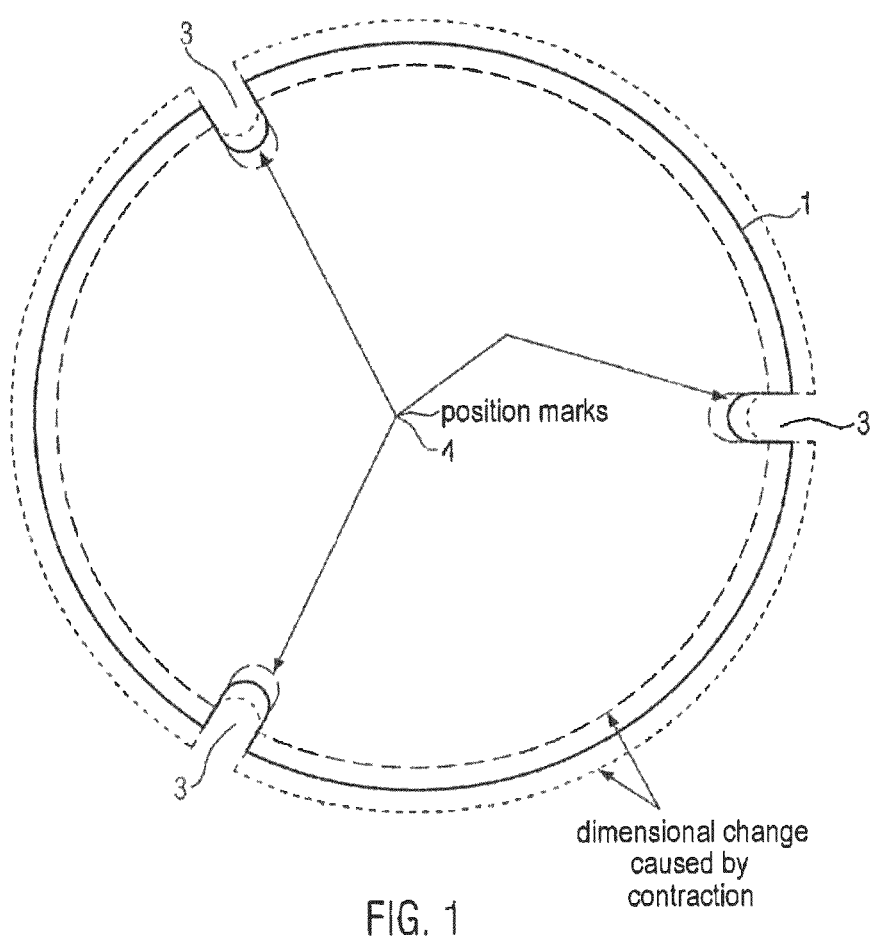
FIG. 1 shows the plan view of a semifinished product according to the application as a dental blank according to a first embodiment.

FIG. 1 shows a plan view of a semifinished product in circular form that is frequently used as a dental blank. In this configuration, three position marks 3 are provided which in this configuration are reproduced in the form of a cutout in the form of a groove and are spaced apart at a rotation angle of 120°. What can be seen clearly is that the position marks are aligned with the center 4 of contraction or expansion. The external dimensions of the semifinished product 1 are illustrated in dashed form, which in this case causes a dimensional change on account of contraction. What can be seen clearly is that, associated with the contraction, the position marks 3 are aligned with the center of contraction or expansion. What can be seen clearly in this case is that the special configuration in the form of a groove represents a simplified form and permits positioning, preferably reproducible positioning.

Figure 2:
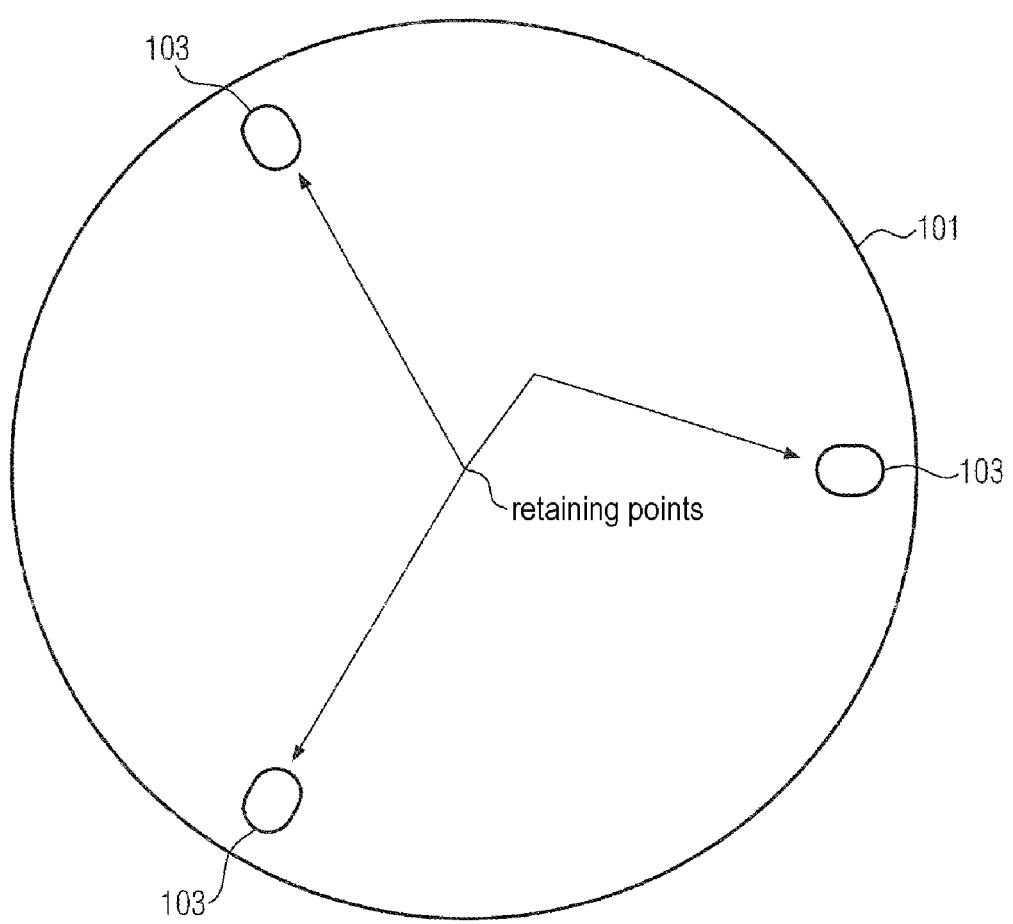
FIG. 2 shows the plan view of a semifinished product according to the application as a dental blank according to a second embodiment.

FIG. 2 likewise illustrates a further configuration of the semifinished product 101, which has further position marks 103. In this case, position marks are represented as elongate holes, which are likewise aligned with the center of contraction or expansion.

Figure 3:
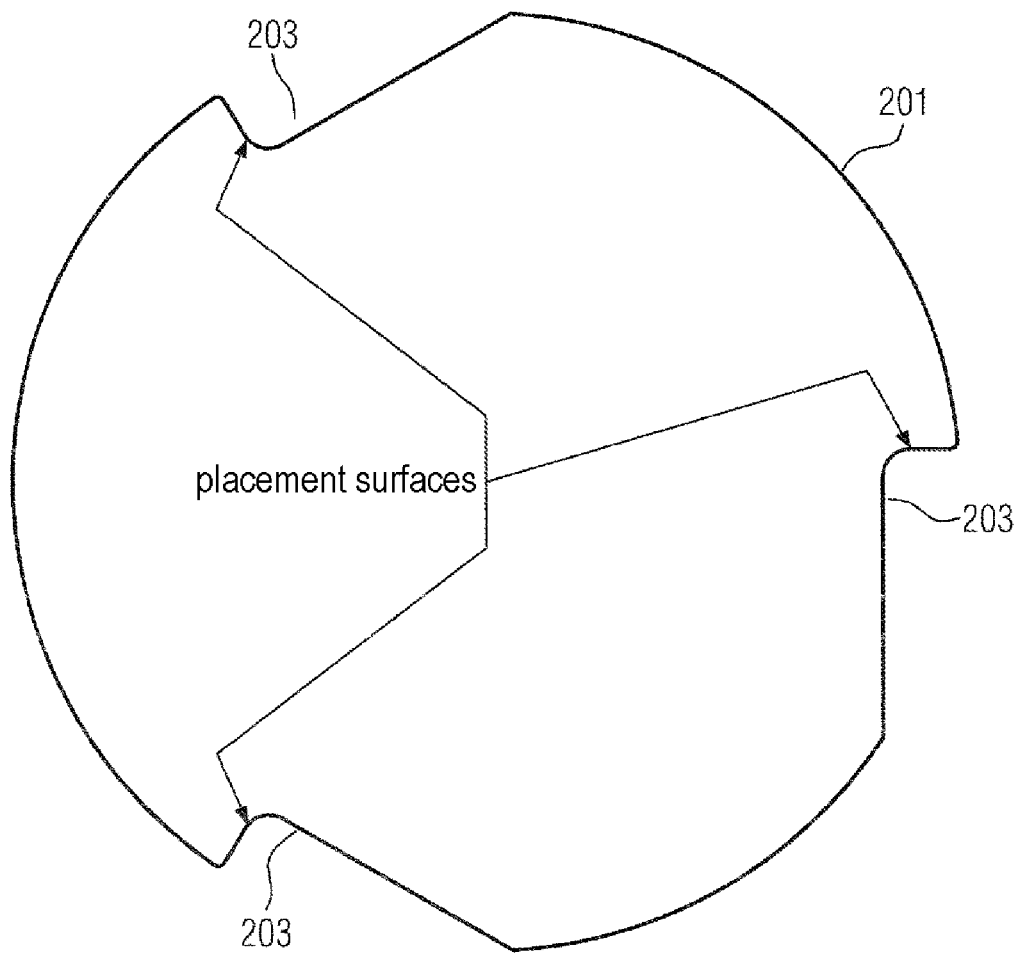
FIG. 3 shows the plan view of a semifinished product according to the application as a dental blank according to a third embodiment.

FIG. 3 represents a further configuration of the semifinished product 201 according to the application, which preferably has cutouts in the form of placement surfaces 203 as position marks. What can be seen in the plan view is that the shaping of the cutouts is asymmetrical, with the result that a preferred pressure point position for holding the semifinished product is given, wherein the pressure point position is then likewise aligned with the direction of contraction or expansion.

Figure 4:
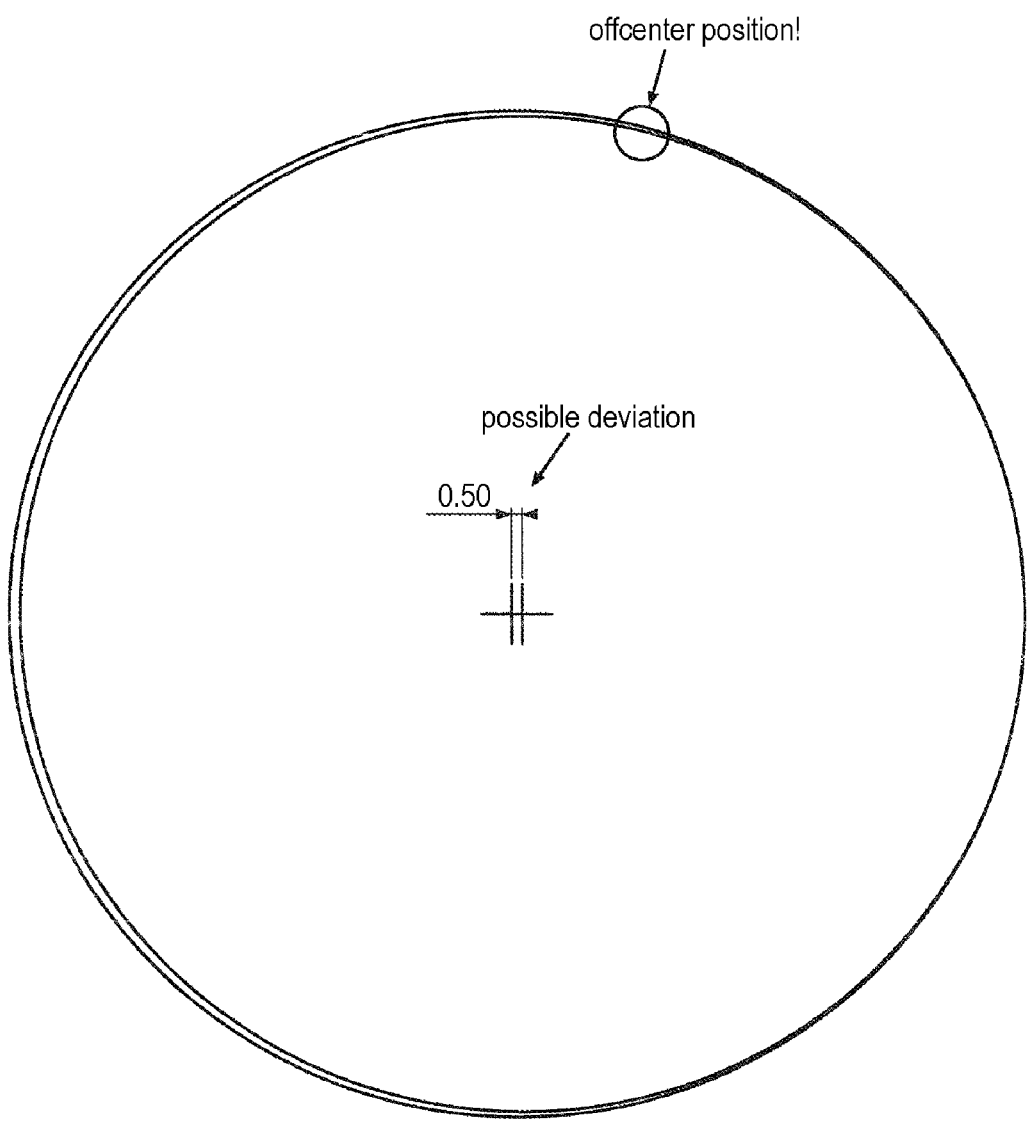
FIG. 4 shows a circular round known semifinished product which exhibits shrinkage of 1%.

FIG. 4 shows a known circular round dental blank which, at a shrinkage of 1% and an original diameter of 100 mm, exhibits a possible diameter deviation of 1 mm. The result of this is that the maximum possible position deviation from the centerpoint can be 0.5 mm, and thus a position shift of a significant extent is present in the machining apparatus, in particular if the machining of the dental blank is performed with the original diameter and possibly the finishing of the dental blank is to be carried out after a contraction or shrinkage process of 1%. Exact positioning that is necessary for the dental field is not possible in this way.

Figure 5:
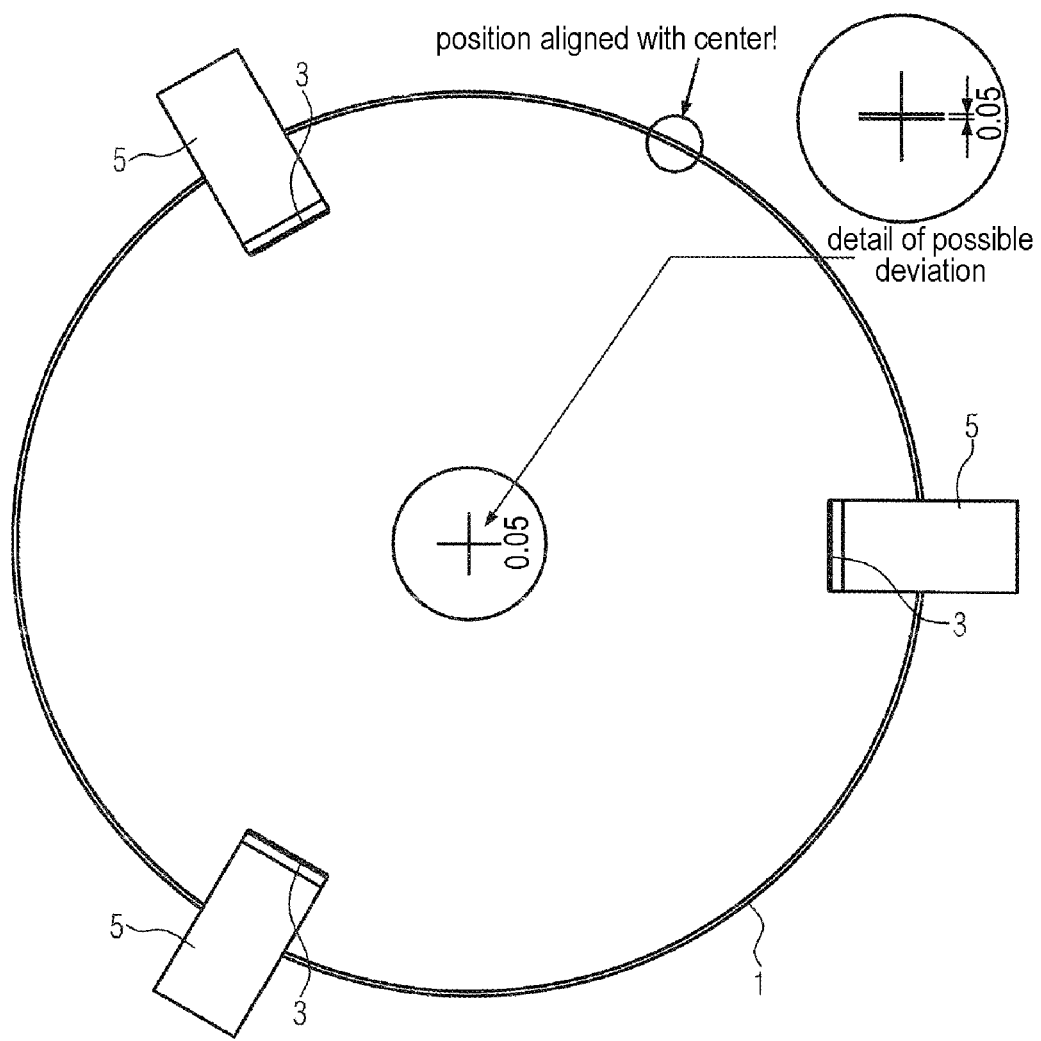
FIG. 5 shows the semifinished product according to the application as a dental blank which is introduced into a machining apparatus.

FIG. 5 illustrates an application example with a stipulation for the semifinished product 1 according to the application with position marks 3, which are positioned via fastening means 5 in a machining apparatus. If in the case according to the application the dental blank is placed into the machining apparatus again after a contraction or shrinkage process of 1% via the position mark 3 and a fastening means 5, even the errors occurring in the center of contraction, in this case of 0.05 mm, can likewise be compensated for, with the result that a positional accuracy is brought about that is increased by a factor of 10 with respect to finishing methods that have been used hitherto. This is achieved according to the invention by way of the position marks 3, which are placed in the contraction direction and have a size of only approximately 10 mm. If the deviation at 1% contraction reduces to 0.1 mm, the position deviation from the centerpoint is then only 0.05 mm.

Introducing the position marks according to the application thus compensates for this value in the machining apparatus, because the contraction on the semifinished product is more easily calculable in the smaller scale of the position mark and the geometry that is provided according to the invention. The position deviation can in this respect thus be halved again at least to 0.25 mm.

The finishing can take place after a heat treatment of the semifinished product.

What is claimed is:

1. A method for positioning a semifinished product, comprising:
   a) providing the semifinished product with at least three spaced-apart position marks each aligned an equal distance from a center of contraction or expansion of the semifinished product;

b) providing a machining apparatus for machining the semifinished product, wherein the machining apparatus comprises a fastening means for fastening the semifinished product;
c) aligning the at least three positioning marks with the fastening means; and
d) finishing the semifinished product while the semifinished product is positioned in the machining apparatus with the three positioning marks aligned with the fastening means; and
wherein the finishing takes place after a heat treatment of the semifinished product.

2. The method of claim 1, wherein the finishing takes place after a removal of moisture from the semifinished product.

3. The method of claim 2, wherein a change in volume due to the removal of moisture results in a contraction or shrinkage of the semifinished product.

4. The method of claim 1, wherein the finishing takes place after a hygroscopicity of the semifinished product.

5. The method of claim 4, wherein a change in volume due to hygroscopicity results in an expansion of the semifinished product.

6. The method of claim 5, wherein the change in volume of the semifinished product exhibits an expansion of 0.5% to 15% with respect to the machining of the semifinished product.

7. The method of claim 1,
wherein a change in volume due to the heat treatment results in a contraction or shrinkage of the semifinished product.

8. The method of claim 1, wherein the semifinished product is a freeform body.

9. The method of claim 8, wherein the freeform body is a dental blank.

10. The method of claim 1, wherein each position mark is an elongate hole having a preferential direction of which is aligned with the center of contraction or expansion.

11. The method of claim 1, wherein each position mark forms a cutout or projection in a peripheral surface of the semifinished product.

12. The method of claim 11, wherein the cutouts are in the form of a groove or placement surfaces.

13. The method of claim 1, wherein the spaced-apart position marks are arranged with rotational symmetry with respect to the center of contraction or expansion.

14. The method of claim 13, wherein three of the spaced-apart position marks are provided in a rotation angle of 120°.

15. The method of claim 14, wherein four of the spaced-apart position marks are provided in a rotation angle of 90°.

16. The method of claim 1, wherein the semifinished product is finished by milling.

* * * * *